(12) United States Patent
Bürge et al.

(10) Patent No.: US 6,514,327 B1
(45) Date of Patent: Feb. 4, 2003

(54) STABILIZED SETTING AND HARDENING ACCELERATOR OF LOW VISCOSITY

(75) Inventors: Theodor A. Bürge, Geroldswil (CH); Marcel Sommer, Winterthur (CH); Franz Wombacher, Oberlunkhofen (CH)

(73) Assignee: Sika AG, vorm. Kaspar Winkler & Co. (CH)

( * ) Notice: Subject to any disclaimer, the term of this patent is extended or adjusted under 35 U.S.C. 154(b) by 0 days.

(21) Appl. No.: 09/697,351

(22) Filed: Oct. 27, 2000

(30) Foreign Application Priority Data

Oct. 29, 1999 (EP) .............................. 99121549

(51) Int. Cl.[7] ......................... C04B 22/08; C04B 24/12; C23F 11/00
(52) U.S. Cl. ................... 106/14.11; 106/14.05; 106/14.15; 106/14.44; 106/287.17; 106/724; 106/727; 106/728; 106/802; 106/808; 106/810; 106/823
(58) Field of Search ............... 106/14.11, 14.44, 106/724, 727, 728, 802, 808, 810, 823, 14.05, 14.15, 287.17; 252/388, 394, 396

(56) References Cited

U.S. PATENT DOCUMENTS 4,507,154 A   3/1985   Bürge et al. ................ 106/728

FOREIGN PATENT DOCUMENTS

| | | |
|---|---|---|
| DE | 266344 | 3/1989 |
| EP | 076927 | 9/1982 |
| EP | 657398 A | 12/1993 |
| EP | 812812 A | 12/1997 |
| FR | 2786175 | * 5/2000 |
| GB | 2059948 | * 4/1981 |
| GB | 2140794 A | 3/1984 |
| JP | 7-90641 | * 4/1995 |
| WO | WO98/18740 | 5/1998 |

OTHER PUBLICATIONS

Chemical Abstracts, vol./ 102, No. 26, Jul. 1985, Abstract No. 225151z.

* cited by examiner

*Primary Examiner*—Anthony J. Green
(74) *Attorney, Agent, or Firm*—Burns, Doane, Swecker & Mathis, L.L.P.

(57) ABSTRACT

Described are liquid setting and hardening accelerators for hydraulic binders and such binder comprising mixtures that preferably are alkali-free and chloride-free and that do not comprise any basic features. The setting accelerators comprise as components aluminum salts, complexing agents, corrosion inhibitors and optionally inorganic and/or organic thickening or thixotropic agents. In comparison with the use of alkaline accelerators, an essential reduction in the setting time and a faster development of high compressive strengths is achieved by the accelerators of the present invention. In comparison with commercially available alkali-free accelerators solid precipitates of aluminum salts and thereby generated plugging up of the spray nozzles is avoided and the corrosion at the spraying devices is eliminated. Said advantages result in a great economic advantage due to less maintenance needed for the devices and less interruptions of work.

31 Claims, 1 Drawing Sheet

STABILIZED SETTING AND HARDENING ACCELERATOR OF LOW VISCOSITY

CROSS REFERENCE TO RELATED APPLICATIONS

This application claims the priority of European Patent application 99 121 549.2, filed Oct. 29, 1999, the disclosure of which is incorporated herein by reference in its entirety.

TECHNICAL FIELD

The present invention concerns a stabilized accelerator of low viscosity for the setting and hardening of a hydraulic binder, its use and a method for setting hydraulic binders using said accelerator.

BACKGROUND ART

Many substances that accelerate the setting and hardening of concrete are already known. The most usual are i.e. strongly alkaline reacting substances such as alkali hydroxides, alkali carbonates, alkali silicates, alkali aluminates and alkaline earth chlorides. With strongly alkaline reacting substances undesired annoyance of the user occurs. Such products may cauterize the skin and cause inflammation of the eye or they may cauterize the cornea thereby affecting the strength of vision. Due to inhalation of the dust or aerosol generated during use, furthermore detrimental effects on the respiratory system may develop.

In view of concrete technology, very alkaline setting accelerators reduce the final strength and enhance the shrinkage, what may cause crack formation and therefore may reduce the long lasting properties, in particular the resistance to sulfates of such concrete.

Besides of the above-mentioned strongly alkaline accelerators also already other accelerators have been described.

Accelerators for the setting of hydraulic binders on the basis of amorphous aluminum hydroxide are already known from EP-A 0 026 262, in particular claims 1 and 11 to 13, as well as from Chemical Abstracts Vol. 86, No. 18, May 1977, page 300, 126087c.

According to EP-A 0 026 262, page 2, last paragraph, the particle size of the amorphous aluminum hydroxide is in particular in the range between 4.8 and 5.4 µm.

In such hardening accelerators also cellulose products that are able the swell and further admixtures may be present, see EP-A 0 026 262, in particular claims 8 to 10 and the examples.

From DE-A 2 548 687, in particular claim and page 15, the addition of aluminum sulfate or nitrates to setting accelerators on the basis of aluminates and aluminum oxide is known.

From FR-A 2 471 955, in particular claims 1 to 6, the use of formiates and nitrates in accelerators is known.

EP 0 076 927 describes a method for accelerating the setting by addition of amorphous aluminum hydroxide and at least one water-soluble sulfate and/or nitrate and/or formiate.

EP 181 739 A1 describes the use of calcium sulfoaluminate and a mixture of calcium aluminates that together with alkalis or earth alkalis upon addition of 250% water result in a hardenable slurry.

JP 63 206 341 A2 protects an accelerator of calcinated alunit, calcium sulfoaluminate, sodium aluminate, sodium carbonate.

JP 58 190 849 A2 describes a mixture of calcium sulfoaluminate, calcium sulfate hemihydrate and calcium hydroxide for the preparation of fast setting, sprayable coatings.

SU 697 427 mentions a fast setting concrete due to admixture of calcium aluminate, calcium sulfoaluminate, calcium oxide, ferrite, silicate and gypsum.

JP 54 027 817 mentions the accelerated hardening of gypsum by addition of calcium sulfoaluminate.

JP 53 099 228 describes an accelerator for casting mortar based on calcium sulfoaluminate and calcium fluoroaluminate and water reducing agents.

In DE-OS 2 163 604 accelerators based on calcium fluoroaluminate are mentioned.

From JP 01 290 543 A2 mixtures of calcium sulfoaluminate and calcium sulfate and lithium carbonate are known as accelerator for low temperature application.

SU 1 350 135 A1 discloses fast setting clinker due to supplementation with barium sulfate, calcium aluminate and calcium sulfoaluminate.

WO 97/36839 discloses the use of lithium silicate and/or lithium aluminate and/or aluminum salts.

WO 98/18740 comprises a method for the production of a setting and hardening accelerator for hydraulic binders. The product that according to claim 1 necessarily consists of 5 components is very turbid, has a high viscosity and a low storage stability. Said accelerator may lead to the plug up of the spray nozzle. At the construction site, the high viscosity results in problems during the dosing of the product, in particular at low temperatures. A dilution of the product is not possible since thereby a part of the basic salts are precipitated. The low pH-value results in corrosion at the dosing and spraying devices.

The goal of the present invention was to provide a composition that acts as setting and hardening accelerator and that preferably is alkali-free and chloride-free and by which very fast setting can be achieved.

BRIEF SUMMARY OF THE INVENTION

Hence, it is general object of the invention to provide a stabilized composition of low viscosity suitable to act as accelerator for the setting and hardening of a binder or a binder comprising mixture, said accelerator comprising at least one aluminum salt, at least one complexing agent for the aluminum and at least one corrosion inhibitor.

A further object of the present invention is a method wherein 0.1 to 10% by weight referred to the weight of the binder of the composition according to the invention is added to said binder or binder comprising mixture.

Possibilities for the application of the composition according to the invention and the method according to the invention is in the production of pre-casting elements and the acceleration of concrete produced at the construction cite. In the first case, the heating (by means of electro heating, or oil heating, or steam), usually applied for accelerating the hardening, can be reduced or even eliminated. In the second case the demolding times of the concrete may be shortened, or the further application of concrete may be continued also at low temperatures. Further applications are in the production of fast setting cement mixtures and mortar mixtures, in particular for fixing prefabricated units, castings etc.

A specific field of use is in particular spraying mortar and spraying concrete. Such mortar and concrete serve the production of buildings of underground and surface engineering as well as the completion and lining of underground, natural or technically produced cavities, such as pit constructions, tunnel constructions or mining constructions, for which the concrete must meet the static requirements as well as being water impermeable. They also serve the consolidation of trenches, slopes, loose walls of rock etc.

DETAILED DESCRIPTION OF THE INVENTION

Figure 1:
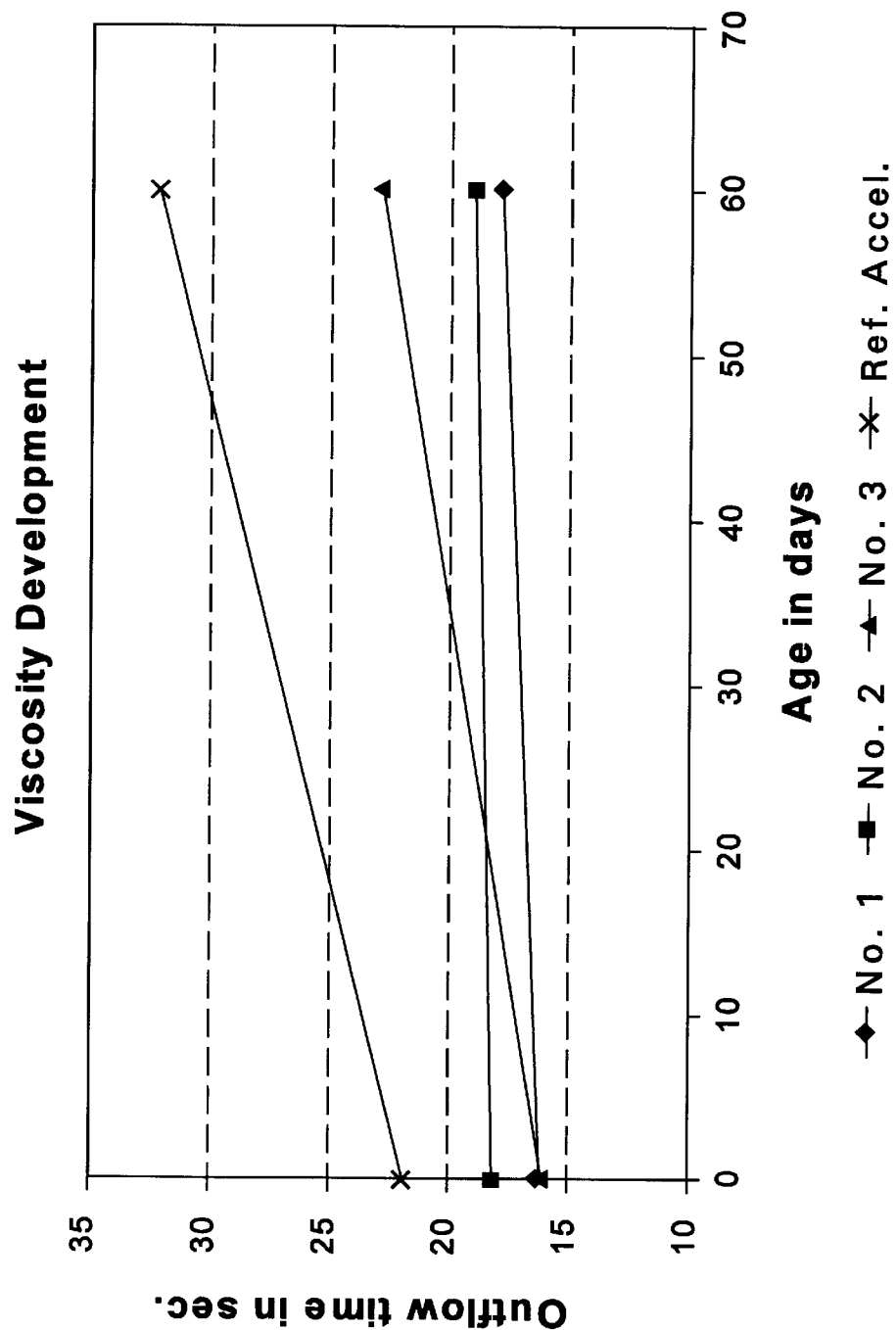
FIG. 1 illustrates the viscosity development of different setting accelerators.

The invention will be better understood and objects other than those set forth above will become apparent when consideration is given to the following detailed description thereof.

The low viscosity stabilized accelerator for the setting and hardening of a hydraulic binder or hydraulic binder comprising mixtures is for example suitable for binders such as cement and hydraulic lime, each alone or in ad-mixture with latent hydraulic binders and/or inert fillers and examples for mixtures comprising such binders are mortar and concrete.

Further aspects of the present invention are defined in further independent claims and preferred embodiments are the subject of dependent claims.

Particularly preferred accelerators according to the present invention are alkali-free and chloride-free. The aluminum salts are preferably selected from the group comprising or consisting of sulfate, nitrate, glycolate, lactate, acetate, formiate, hydroxy formiate, the respective basic salts of the sulfate, nitrate, glycolate, lactate, acetate, formiate, hydroxy formiate, or mixtures of such salts. Preferably, the accelerator has a pH-value between 2 and 5, said pH-value being generated by a stoichiometric access of acid, for example organic acid. If sulfates and/or nitrates are present, then a molar ratio between sulfate and/or nitrate to organic acid of 0.1 to 10 is preferred. Preferred complexing agents are chosen from the group comprising nitrilotriacetic acid, ethylene diamine tetraacetic acid, gluconic acid, heptonic acid, phosphonic acid or mixtures thereof. Usually such a complexing agent is present in an amount of 0.1 to 5.0% by weight. Preferred corrosion inhibitors are chosen from the group comprising alkines
butine diol
propargyl alcohol
3-(methylamino)propylamine
3-(dimethylamino)propylamine
3-(diethylamino)propylamine
cyclohexylamine
N-methylcyclohexylamine
N-ethylcyclohexylamine
1-(dimethylamino)-2-propanol
1-(ethylamino)-2-propanol
1-(cyclohexylamino)-2-propanol
3-amino-1-propanol
2-aminoethanol
2, 2'-iminodiethanol
2-(methylamino)ethanol
2-(dimethylamino)ethanol
2-(ethylamino)ethanol
2-(diethylamino)ethanol
and mixtures thereof.

Usual amounts of such corrosion inhibitors are in the range of 0.1 to 10.0% by weight referred to the weight of the binder. Furthermore, the accelerator may comprise at least one thickening agent that preferably is selected from the group comprising or consisting of bentonite, bentones, fermented organic biopolymers, alginates, polyglycolethers, acrylate thickeners or urethane thickeners, organic carbonic esters and mixtures thereof. The accelerators of the present invention are preferably used to accelerate the setting and hardening of hydraulic binders, hydraulic binders in admixture with latent hydraulic binders and/or inert fillers, in particular for the acceleration of the setting and hardening of mortar or concrete. Particularly preferred is the use of the inventive setting and hardening accelerators in spraying mortar or spraying concrete, whereby they can be processed in the dry spraying process as well as in the wet spraying process. Thereby, the accelerator can be added to the dry binder, mortar or concrete or to binder, mortar or concrete admixed with water, by means of a liquid dosing apparatus. Said addition by means of a liquid dosing apparatus may be performed directly into the mixture or into the mixing water in the conveyor hose, the pre-wetting nozzle or the spray nozzle.

For all these applications, the setting and hardening accelerator can be used as solution, preferably with a dry content of 20–60%. The setting and hardening accelerator having the inventive composition can also be present as powder, whereby in this case it is preferred that it is dissolved in water prior to its use, e.g. at the construction site. It has been found that such dissolving in water at the construction site only does not bear any disadvantage with regard to the setting and hardening characteristics, however, great advantages with regard to the transport are obtained since no water has to be transported, a fact that is very much desirable in ecologic as well as economic respects.

By the use of the setting and hardening accelerators of the present invention, a very fast setting of the respective binders, or the mixtures comprising such binders, is effected, and high initial and final strength is achieved. The setting and hardening accelerator neither to the user nor to the environment have a caustic or toxic effect. Furthermore, if compared to the use of alkaline accelerators, a significant reduction in the setting time and a fast development of high compressive strength is achieved. In comparison with commercialized alkali-free accelerators solid precipitations of aluminum salts and thereby generated plugging up of spray nozzles are avoided and the corrosion at the spraying apparatuses is eliminated.

Simultaneously, the costs at the construction site can be reduced due to the improved efficiency and the lower maintenance requirements of the apparatuses as well as the reduced breakdown time compared to hitherto used alkali-free accelerators. Besides of the technical advantages also very great economic advantage result.

Since the setting accelerators of the present invention do not need any alkali, neither the development of strength nor the shrinkage are affected.

The following examples shall further describe the invention.

EXAMPLES

Accelerator consisting of:

| No. | Component | % by mass |
|---|---|---|
| 1 | Water | 36.4 |
|   | Aluminum dihydroxyformiate | 21 |
|   | Aluminum sulfate · 14 $H_2O$ | 42 |
|   | EDTA (stabilizer) | 0.1 |
|   | Butine diol (corrosion inhibitor) | 0.5 |
| 2 | Water | 35.4 |
|   | Aluminum dihydroxyformiate | 19 |
|   | Aluminum sulfate · 14 $H_2O$ | 45 |
|   | EDTA (stabilizer) | 0.1 |
|   | Butine diol (corrosion inhibitor) | 0.5 |
| 3 | Water | 43.4 |
|   | Aluminum dihydroxyformiate | 26 |
|   | Aluminum sulfate · 14 $H_2O$ | 30 |
|   | EDTA (stabilizer) | 0.1 |
|   | Butine diol (corrosion inhibitor) | 0.5 |

EDTA=Ethylene diamine tetraacetate (complexing agent for aluminum ions)
were compared in the following examples with a usual, commercially available alkali-free accelerator.

In the following examples the influence of the inventive setting accelerator to cementituous systems is shown. As mixtures for examination mortars were chosen, that are intended to simulate concrete. Said mixtures are composed as follows:

| Portland cement type CEM I 42.5 | 250.00 g |
|---|---|
| Sand 0–2.2 mm | 750.00 g |
| Water | 122.50 g |
| Super plastiziser on the basis of melamine | 2.50 g |

The setting samples were examined with a penetrometer of the firm RMU (Italy). Begin of setting and end of setting were recorded at a penetration resistance of the 2 mm needle of 600 g or 2200 g, respectively.

From said mixtures prismatic samples in the dimension 4×4×16 cm were produced and stored at 20° C. and 95% relative humidity.

Example 1

This example shows the effect on the setting time of a setting accelerator of the present invention in comparison to a usual accelerator.

| Accelerator | Resistance to penetration | |
|---|---|---|
|  | 600 g | 2200 g |
| Accelerator according to invention No. 1 | 20 min. | 50 min. |
| Accelerator according to invention No. 2 | 17 min. | 53 min. |
| Accelerator according to invention No. 3 | 22 min. | 47 min. |
| Usual, commercially available accelerator | 30 min. | 65 min. |

Accelerator=6% referred to the cement mixture

Example 2

In this example a comparison of the development of strength by means of the samples described at the beginning is shown. Presented are the compressive strength in MPa after 1 day, 7 days and 28 days (day=d).

| Accelerator | 1 d | 7 d | 28 d |
|---|---|---|---|
| Accelerator according to invention No. 1 | 18 | 31 | 48 |
| Accelerator according to invention No. 2 | 19 | 32 | 48 |
| Accelerator according to invention No. 3 | 16 | 27 | 43 |
| Usual, commercially available accelerator | 16 | 30 | 45 |

Example 3

In this example the significantly improved or lower viscosity, respectively, of the accelerator according to the invention compared with usual setting accelerators is shown. The viscosity was measured by means of the outflow time from a Ford cup 0 4 mm.

| | Age of sample | |
|---|---|---|
| Accelerator | new | 2 months |
| Accelerator according to invention No. 1 | 16 | 18 |
| Accelerator according to invention No. 2 | 18 | 19 |
| Accelerator according to invention No. 3 | 16 | 23 |
| Usual, commercially available accelerator | 22 | 32 |

Outflow time=sec.

Clearly recognizable is the lasting low value of the outflow time of the inventive accelerator compared to the almost twice as long time of the usual accelerator. The viscosity development is shown in FIG. 1.

Example 4

In order to reduce the corrosion of metallic parts of the pump, hose connecting pieces and spray nozzles, a corrosion inhibitor was added to the accelerator of the present invention. The time until the start of the corrosion could be enhanced from 3 days for the commercial accelerator to 9 days in the case of the inventive accelerators.

The measurement was made on polished normed steel platelets (3×3 cm) that were entirely covered with setting accelerator diluted with water in a ratio of 1:10, and stored therein. The platelets were optically examined in one day intervals, leading to the above-mentioned result.

While there are shown and described presently preferred embodiments of the invention, it is to be distinctly understood that the invention is not limited thereto but may be otherwise variously embodied and practiced within the scope of the following claims.

What is claimed is:

1. A composition comprising at least one aluminum salt and furthermore a) at least one complexing agent for aluminum ions and b) at least one corrosion inhibitor, wherein said composition is an aqueous solution with a concentration of 20–60% by weight of solid matter.

2. The composition of claim 1 which is alkali-free and chloride-free.

3. The composition of claim 1 wherein the aluminum salt is a sulfate, nitrate, glycolate, lactate, acetate, formiate, hydroxyformiate thereof, or a basic salt of the sulfate, nitrate, glycolate, lactate, acetate, formiate, hydroxyformiate thereof, or mixtures of such salts.

4. The composition of claim 1 that comprises an acid in an amount corresponding to a stoichiometric excess of acid such that the pH-value is between 2 and 5.

5. The composition of claim 4 wherein said acid is an organic acid.

6. The composition of claim 5 wherein a molar ratio of sulfate and/or nitrate to organic acid is from 0.1 to 10.

7. The composition of claim 1 wherein the complexing agent is selected from the group consisting of nitrilotriacetic acid, ethylene diamine tetraacetic acid, gluconic acid, heptonic acid, phosphonic acid and mixtures thereof.

8. The composition of claim 1 wherein the complexing agent is comprised in an amount of from 0.1 to 5.0% by weight.

9. The composition of claim 1 wherein the corrosion inhibitor is selected from the group consisting of
alkynes
butyne diol
propargyl alcohol
3-(methylamino)propylamine
3 -(dimethylamino)propylamine
3 -(diethylamino)propylamine
cyclohexylamine
N-methylcyclohexylamine
N-ethylcyclohexylamine
1-(dimethylamino)-2-propanol
1-(ethylamino)-2-propanol
1-(cyclohexylamino)-2-propanol
3-amino-1-propanol
2-aminoethanol
2,2'-iminodiethanol
2-(methylamino)ethanol
2-(dimethylamino)ethanol
2-(ethylamino)ethanol
2-(diethylamino)ethanol
and mixtures thereof.

10. The composition of claim 1 wherein the corrosion inhibitor is comprised in an amount of from 0.1 to 10.0% by weight.

11. The composition of claim 1 further comprising at least one thickening agent.

12. The composition of claim 11 wherein said thickening agent is selected from the group consisting of bentonite, bentones, fermented organic biopolymers, alginates, polyglycolethers, acrylate thickeners or urethane thickeners, organic carbonic esters and mixtures thereof.

13. A method for the acceleration of the setting and hardening of hydraulic binders, hydraulic binders in admixture with latent hydraulic binders and/or inert fillers, mortar or concrete, wherein a composition of claim 1 is added to said hydraulic binders, hydraulic binders in admixture with latent hydraulic binders and/or inert fillers, mortar or concrete.

14. The method of claim 13, wherein said hydraulic binders in admixture with latent hydraulic binders and/or inert fillers are spraying mortar or spraying concrete applicable according to the dry or wet spraying method.

15. The method of claim 14 wherein the accelerator is added to the binder, mortar or concrete, said binder, mortar or concrete being in dry form, or to the binder, mortar or concrete mixed with water, in a conveyor pipeline, a prewetting nozzle and/or a spray nozzle, said addition being performed with a liquid dosing apparatus directly into a mixture of said accelerator with said binder, mortar or concrete, or into the mixing water which is mixed with said binder, mortar or concrete.

16. A composition comprising at least one aluminum salt and furthermore a) at least one complexing agent for aluminum ions and b) at least one corrosion inhibitor, wherein said composition is in the form of a powder.

17. The composition of claim 16 which is alkali-free and chloride-free.

18. The composition of claim 16 wherein the aluminum salt is a sulfate, nitrate, glycolate, lactate, acetate, formiate, hydroxyformiate, thereof, or a basic salt of the sulfate, nitrate, glycolate, lactate, acetate, formiate, hydroxyformiate thereof, or mixtures of such salts.

19. The composition of claim 16 that comprises an acid in an amount corresponding to a stoichiometric excess of acid such that the pH-value of a solution of the composition is between 2 and 5.

20. The composition of claim 19 wherein said solution is an aqueous solution with a concentration of 20–60% by weight of said composition.

21. The composition of claim 19 wherein said acid is an organic acid.

22. The composition of claim 21 wherein a molar ratio of sulfate and/or nitrate to organic acid is from 0.1 to 10.

23. The composition of claim 16 wherein the complexing agent is selected from the group consisting of nitrilotriacetic acid, ethylene diamine tetraacetic acid, gluconic acid, heptonic acid, phosphonic acid and mixtures thereof.

24. The composition of claim 16 wherein the complexing agent is comprised in n an amount of from 0.1 to 5.0% by weight.

25. The composition of claim 16 wherein the corrosion inhibitor is selected from the group consisting of
alkynes
butyne diol
propargyl alcohol
3-(methylamino)propylamine
3-(dimethylamino)propylamine
3-(diethylamino)propylamine
cyclohexylamine
N-methylcyclohexylamine
N-ethylcyclohexylamine
1-(dimethylamino)-2-propanol
1-(ethylamino)-2-propanol
1-(cyclohexylamino)-2-propanol
3-amino-1-propanol
2-aminoethanol
2,2'-iminodiethanol
2-(methylamino)ethanol
2-(dimethylamino)ethanol
2-(ethylamino)ethanol
2-(diethylamino)ethanol
and mixtures thereof.

26. The composition of claim 16 wherein the corrosion inhibitor is comprised in an amount of from 0.1 to 10.0% by weight.

27. The composition of claim 16 further comprising at least one thickening agent.

28. The composition of claim 27 wherein said thickening agent is selected from the group consisting of bentonite, bentones, fermented organic biopolymers, alginates, polyglycolethers, acrylate thickeners or urethane thickeners, organic carbonic esters and mixtures thereof.

29. A method for the acceleration of the setting and hardening of a hydraulic binder, and mortar and concrete produced therefrom, wherein the composition according to claim 16 is transferred into a solution by mixing with water and then added to a mixture comprising said hydraulic binder in an amount of said solution of from 0.1 to 10% by weight referred to the weight of hydraulic binder.

30. A method for the acceleration of the setting and hardening of a hydraulic binder, and mortar and concrete produced therefrom, wherein the composition according to claim 16 added to a mixture comprising said hydraulic binder in an amount of from 0.1 to 10% by weight referred to the weight of hydraulic binder.

31. A composition comprising at least one aluminum salt and furthermore a) at least one complexing agent for aluminum ions and b) at least one corrosion inhibitor, wherein said at least one corrosion inhibitor is selected from the group consisting of
alkynes
butyne diol
propargyl alcohol
3-(methylamino)propylamine
3-(dimethylamino)propylamine
3-(diethylamino)propylamine
cyclohexylamine
N-methylcyclohexylamine
N-ethylcyclohexylamine
1-(dimethylamino)-2-propanol
1-(ethylamino)-2-propanol
1-(cyclohexylamino)-2-propanol
3-amino-1-propanol
2-amino ethanol
2,2'-iminodiethanol
2-(methylamino)ethanol
2-(dimethylamino)ethanol
2-(ethylamino)ethanol
2-(diethylamino)ethanol
and mixtures thereof.

* * * * *